US006857338B2

(12) United States Patent
Tsergas

(10) Patent No.: US 6,857,338 B2
(45) Date of Patent: Feb. 22, 2005

(54) HIGH TORQUE RESISTANT AND STRONG SCREWLESS PLASTIC GEAR BOX

(75) Inventor: Athanase N. Tsergas, Wood Dale, IL (US)

(73) Assignee: Molon Motor & Coil Corp., Rolling Meadows, IL (US)

( * ) Notice: Subject to any disclaimer, the term of this patent is extended or adjusted under 35 U.S.C. 154(b) by 217 days.

(21) Appl. No.: 10/222,886

(22) Filed: Aug. 19, 2002

(65) Prior Publication Data

US 2004/0031343 A1 Feb. 19, 2004

(51) Int. Cl.$^7$ ............................................. F16H 57/02
(52) U.S. Cl. ................................. 74/606 R; 74/421 A
(58) Field of Search ............................. 74/414, 606 R, 74/413, 412 R, 421 A

(56) References Cited

U.S. PATENT DOCUMENTS

| | | | |
|---|---|---|---|
| 2,908,180 A | | 10/1959 | Swenson ...................... 74/421 |
| 4,441,378 A | * | 4/1984 | Ponczek ...................... 74/414 |
| 4,474,077 A | * | 10/1984 | Debelius ................... 74/606 R |
| 4,708,027 A | * | 11/1987 | Stenner ..................... 74/421 A |
| 4,825,727 A | | 5/1989 | Komuro ........................ 74/801 |
| 5,038,629 A | | 8/1991 | Takimoto .................. 74/421 A |
| 5,156,069 A | * | 10/1992 | Bitsch et al. ............. 74/606 R |
| 5,598,746 A | | 2/1997 | Chen ......................... 74/606 R |
| 5,624,139 A | * | 4/1997 | Van Kooten ................. 285/31 |
| 5,720,206 A | | 2/1998 | Watanabe et al. ......... 74/606 A |
| 5,737,968 A | * | 4/1998 | Hardey et al. ............. 74/421 A |
| 5,836,219 A | * | 11/1998 | Klingler et al. ........... 74/606 R |

FOREIGN PATENT DOCUMENTS

| | | |
|---|---|---|
| EP | 0 617 213 | 9/1994 |
| FR | 2 698 943 | 6/1994 |
| GB | 2 244 538 | 12/1991 |
| JP | 2-35251 | 2/1990 |

* cited by examiner

*Primary Examiner*—David Fenstermacher
(74) *Attorney, Agent, or Firm*—Oblon, Spivak, McClelland, Maier & Neustadt, P.C.

(57) ABSTRACT

A high torque resistant and strong screwless plastic gear box has a reduced thickness at its output shaft. The gear box and a reduction drive assembly therein may be used particularly, but not exclusively, in a slot machine with a spinning drum or hopper which holds coins or tokens to be released therefrom. The gear box includes a main body and a cover which is ultrasonically welded thereto. Locating posts, holding tubes, inner welding pads, outer surrounding tubes, and locating ribs are provided to weld the cover to the main body. Acoustical chambers are formed between outer walls and inner arcuate walls of the main body. The inner arcuate walls surround all of the shafts and gears inside the main body. This double-walled construction reduces noise and provides surprising mechanical strength. All of the gears are mounted on only three shafts secured between the main body and the cover. Four of the gears are stacked on a single central shaft and rotate in two pairs independently of each other.

23 Claims, 6 Drawing Sheets

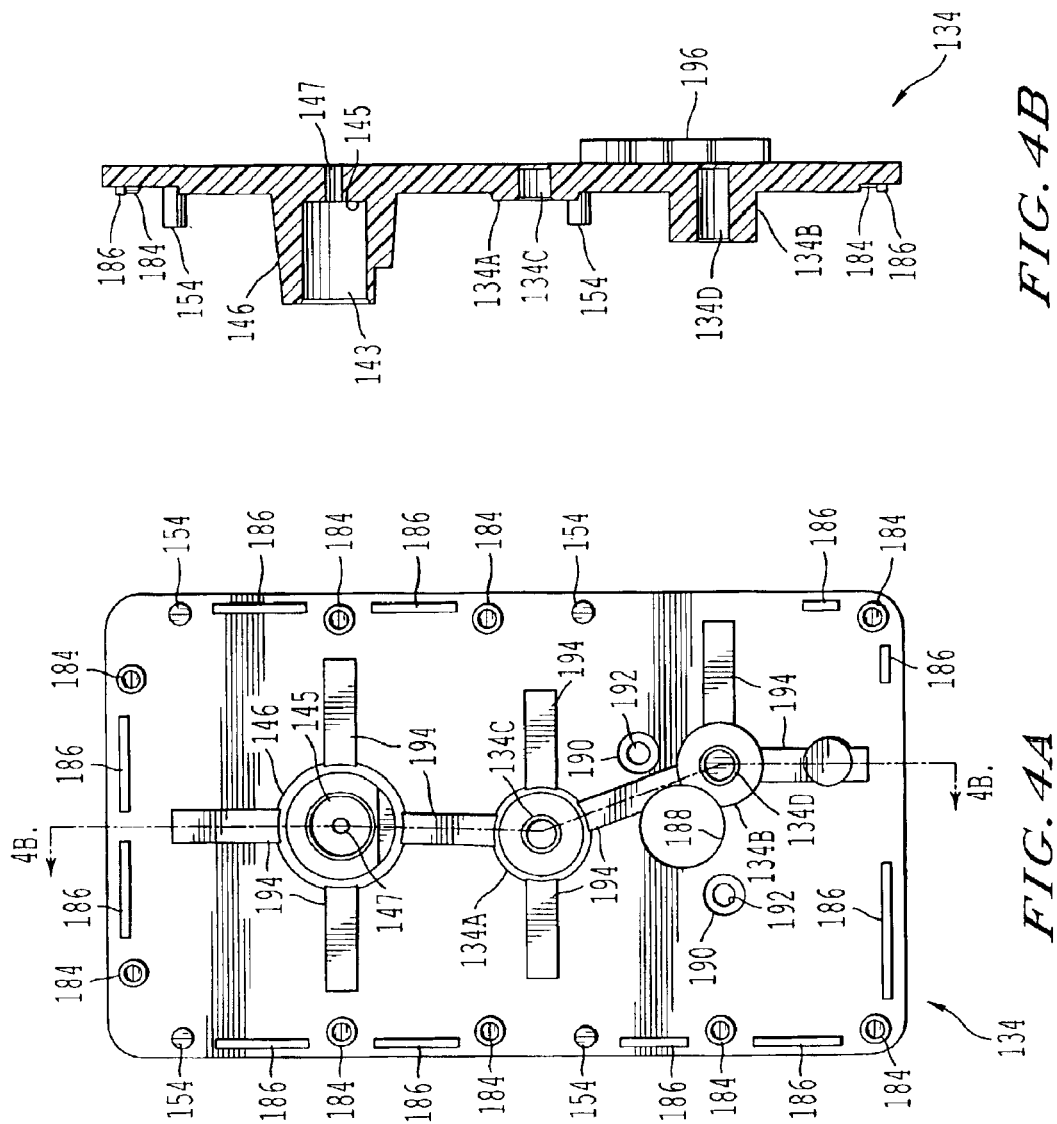

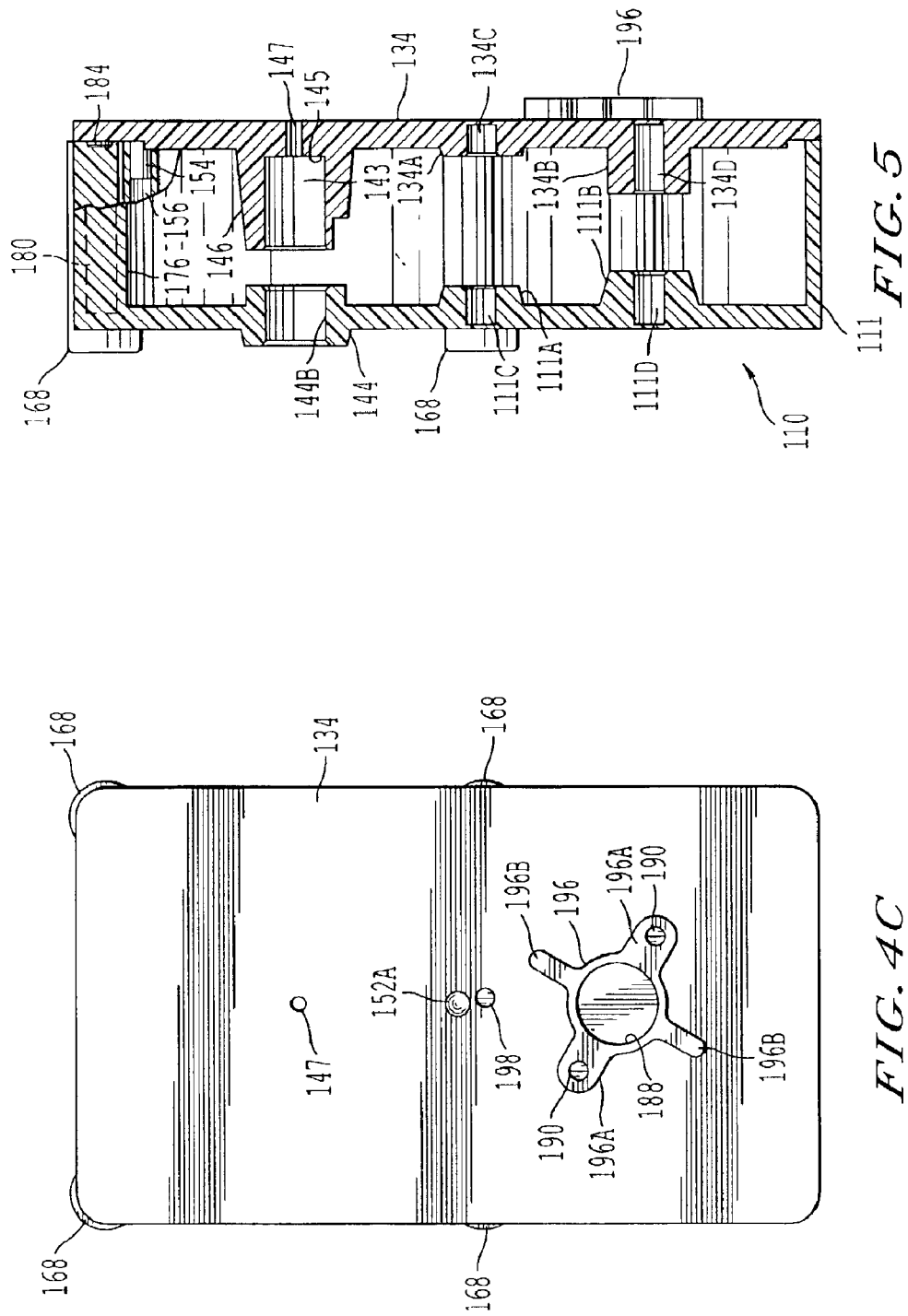

HIGH TORQUE RESISTANT AND STRONG SCREWLESS PLASTIC GEAR BOX

CROSS REFERENCE TO RELATED APPLICATION

This application is related to U.S. Des. patent application Ser. No. 29/165,821 filed concurrently herewith.

BACKGROUND OF THE INVENTION

1. Field of the Invention

This invention relates to machine elements and mechanisms generally, but more particularly to small but strong plastic gear boxes with reduction drive assemblies inside.

2. Description of the Related Art

U.S. Pat. No. 5,598,746 to Chen describes a transmission assembly having a plastic box and cover employing locating posts. U.S. Pat. No. 5,737,968 to Hardey et al. discloses a gear motor assembly with a three-part molded housing having plural cylindrical connector bosses which may be ultrasonically welded together. U.S. Pat. No. 4,825,727 to Komuro relates to a speed reducer having a gear mounting plate formed with ribs for noise reduction. These three prior art devices appear to be most relevant to the gear box of the present invention, in the applicant's view.

U.S. Pat. No. 2,908,180 to Swenson reveals a gear reduction unit for a fractional horsepower motor comprising a stationary stub shaft and a rotatable work shaft with a train of intermeshing reduction gears floating free on both shafts to drive a final fixed output gear on a power shaft in the last stage. Power is received from a motor pinion driving a floating gear on a power shaft in the first or input state. U.S. Pat. No. 5,038,629 to Takimoto discloses a drive transmission mechanism having plural stages of gear reduction. Plural gears are supported by the same shaft and are rotatable relative to each other. For an example, see column 4 at lines 22–27. European Patent No. 617,213 to Masumi refers to a motorized actuator having a train of reduction gears. Plural supporting shafts each have more than one gear thereon and are able to rotate relative to one another. See column 5, line 56, through column 6, line 39. These three earlier patents appear to be the most relevant references in relation to the reduction drive assembly of the present invention, in the applicant's view.

An exemplary prior art device is illustrated in a cross-sectional view in FIG. 1. A gear box 10 has a main body 11 made of die cast zinc metal and is attached to a direct current (D.C.) motor 12 which drives a small input gear 14 held on an input shaft 16. The small input gear 14 drives a first cluster gear 18 which rotates with a first pinion gear 20 that, in turn, drives a second cluster gear 22 which rotates with a second pinion gear 24. The first cluster gear 18 and the first pinion gear 20 are mounted on a first shaft 26 while the second cluster gear 22 and the second pinion gear 24 are mounted on a second shaft 28. The first shaft 26 and the second shaft 28 are topped by spacers 30 and 32, respectively, that separate the shafts 26 and 28 from a cover 34 which is connected by screws (not shown) to the main body 11 and which is also made of the same die cast zinc metal as the main body 11. The second pinion gear 24 drives a third cluster gear 36 which rotates with a third pinion gear 38 that, in turn, drives a large output gear 40 mounted on an output shaft 42. A first collar 44 secures one end of the output shaft 42 to the main body 11 while a second collar 46 secures an opposite end of the output shaft 42 to the cover 34. A small, flat sheet of steel is rolled to form a C-shaped pin 48 that is inserted at the opposite end of the output shaft 42 in order to spin a drum or hopper 6 holding coins or tokens in a slot machine 1. The gear box 10 is fastened to the slot machine 1 through a wall 4 by a plurality of bolts 8.

Although the exemplary prior art device illustrated in FIG. 1 is made of metal, it requires screws (not shown) to fix the cover 34 to the main body 11. Thus, because the holes required for the screws weaken the solid structure of both the main body 11 and the cover 34, the gear box 10 is not as strong as it could be if there were no screw holes therethrough.

Also, because of the positioning of the various cluster gears and pinion gears on five separate shafts, the amount of force which can be transmitted from the small input gear 14 to the large output shaft 42 is limited. Thus, it remains a problem in the prior art to produce a high torque resistant and strong screwless gear box holding a reduction gear assembly inside.

SUMMARY OF THE INVENTION

A primary object of the present invention is to provide a high torque resistant and strong screwless plastic gear box to overcome the problems existing with prior art metal gear boxes.

A secondary object of the present invention is to reduce substantially the thickness of the gear box at the output shaft.

The present invention relates generally to a plastic gear box and a reduction drive assembly for mounting in the gear box to achieve the above-stated goals. The gear box and the reduction drive assembly may be used particularly, but not exclusively, in a slot machine with a spinning drum or hopper which holds coins or tokens to be released therefrom upon receiving an electrical signal after a predetermined number of coins have been deposited into the slot machine.

The gear box includes a plastic main body and a plastic cover which is ultrasonically welded to the main body. Welding pads and surrounding tubes are provided at intervals around a periphery of the main body and the cover. Also, locating ribs are provided inside the cover of the gear box. Plural locating posts on the cover are ultrasonically welded into corresponding hollow holding tubes in the main body to increase the strength of the gear box so that it can withstand high torque levels without fracturing.

This arrangement results in an empty gear box, without the drive assembly inside, being capable of withstanding torques up to 300 inch-pounds and weights up to at least 225 pounds without breakage and without the use of any screws to retain the cover on the main body.

This main body also has acoustical chambers between outer straight walls and inner arcuate walls. The inner arcuate walls surround all of the various shafts and gears inside the main body. This double-walled construction reduces noise and provides surprising mechanical strength greater than that of any other known prior art plastic gear boxes. This characteristic of the present invention was an unexpected result for a plastic gear box resulting in strength comparable to a metal gear box.

The drive assembly mounted between the cover and the main body includes gears mounted on only three shafts instead of the five shafts of the prior art device shown in FIG. 1. Power from a D.C. motor is supplied to the gear mounted on a first input shaft. This gear, in turn, drives gears stacked on a single central shaft. The last of the central gears then drives an output gear on the output shaft.

To summarize the invention, it relates to a high torque resistant and strong screwless plastic gear box, particularly characterized by ultrasonically welded pads, locating ribs and support posts. The invention also relates to the drive assembly described above by which four of the central gears are stacked to rotate in pairs independently on a single central shaft.

BRIEF DESCRIPTION OF THE DRAWINGS

A more complete appreciation of the invention and its advantageous features will be readily understood by reference to the following detailed discussion when considered with the accompanying drawings that are briefly described below.

FIG. 4A is an underside view of the cover of the gear box.

FIG. 4B is a cross-sectional side elevation view taken along line 4B—4B of FIG. 4A.

FIG. 4C is a top plan view of the cover with the main body of the gear box thereunder.

FIG. 5 is a partially cutaway cross-sectional view of the gear box with the internal drive assembly removed therefrom.

DETAILED DESCRIPTION OF THE PREFERRED EMBODIMENT

Figure 1:
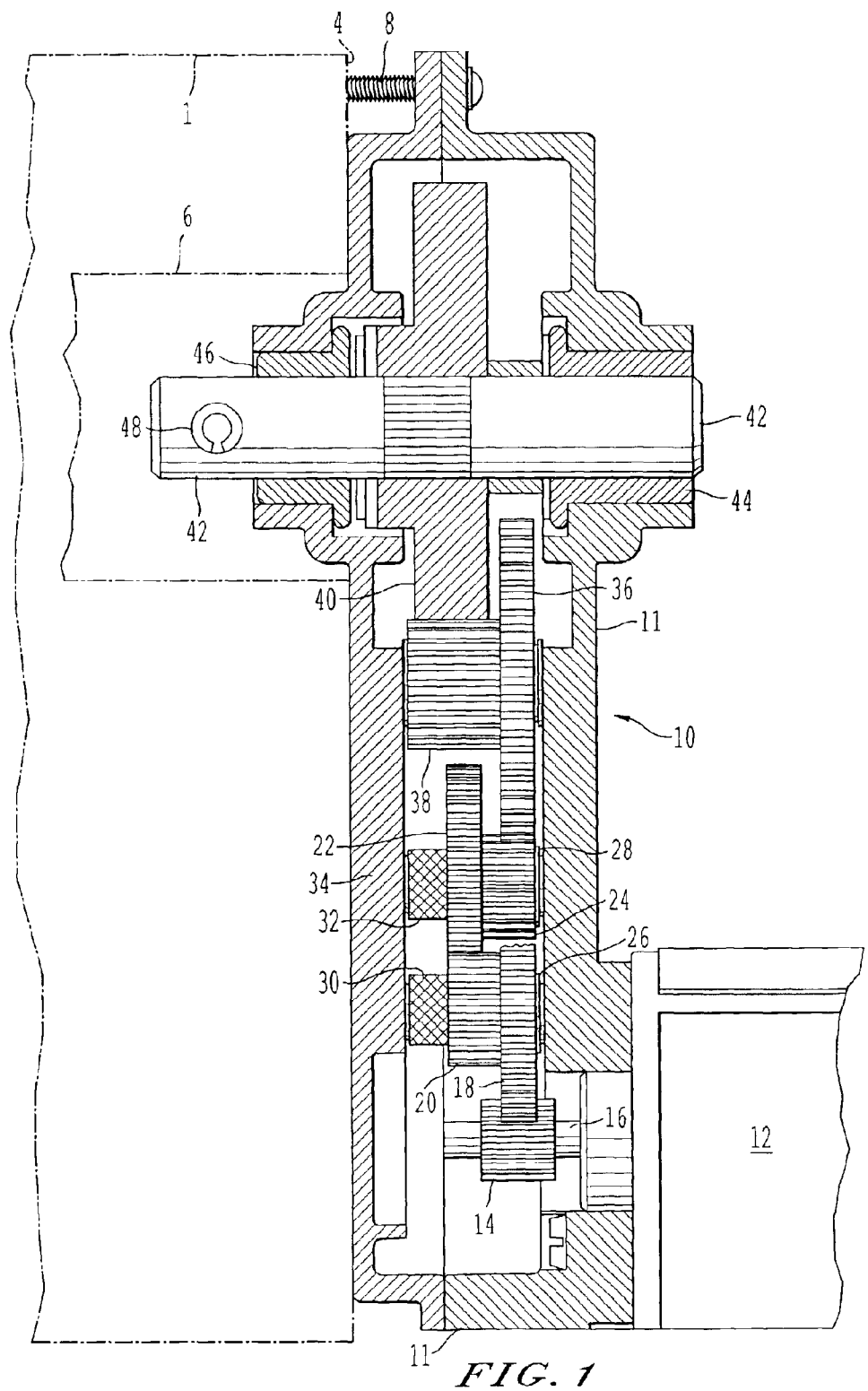
FIG. 1 is a cross-sectional side elevation view of a known prior art device.

Referring now to the drawings, like reference numerals designate identical or corresponding parts throughout the several views.

Figure 2A:
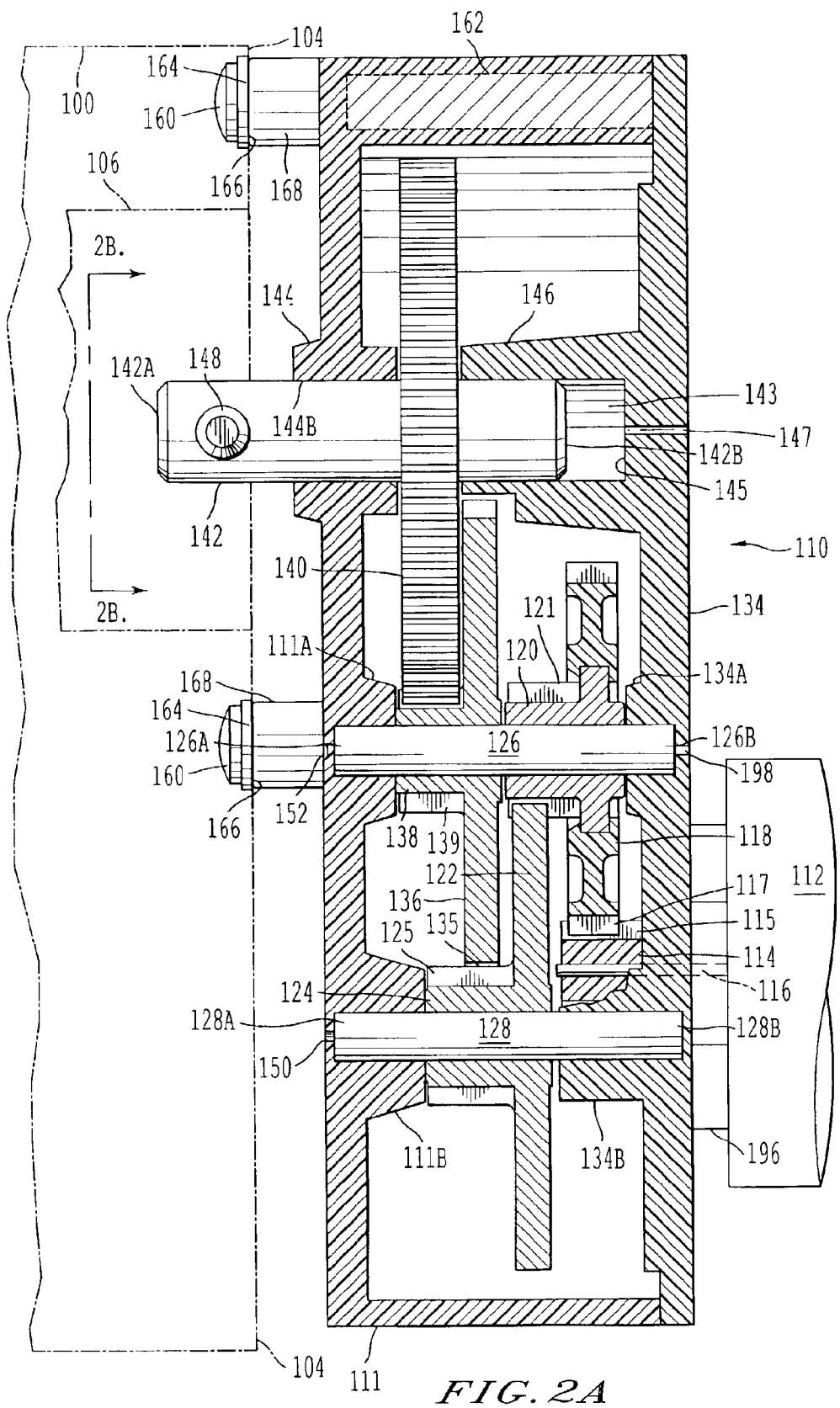
FIG. 2A is a cross-sectional side elevation view of the gear box of the present invention with the internal drive assembly under a cover.

A cross-sectional view of the invention is shown in FIG. 2A. A gear box 110 has a main body 111 made of ABS plastic and is attached to a direct current (D.C.) motor 112 which turns a small input shaft 116 that carries and rotates a small input gear 114. Teeth 115 on the small input gear 114 mesh with and drive teeth 117 on a first central gear 118 which carries and rotates with a first pinion gear 120. This gear 120 has teeth 121 that, in turn, drive a second gear 122 which carries and rotates with a second pinion gear 124.

The small input gear 114 is made of hard plastic while the small input shaft 116 is made of steel. The first central gear 118 is made of plastic while the first pinion gear 120 is made of steel. Both the second gear 122 and the second pinion gear 124 are formed integrally of steel. Note that the first steel pinion gear 120 and the second steel pinion gear 124 have diameters of the same size.

The first central gear 118 and the first pinion gear 120 are mounted on a single central shaft 126 while the second gear 122 and its pinion gear 124 are mounted on a second shaft 128. The single central shaft 126 is held at one end 126A in a first raised boss 111A of the main body 111 and is held at its opposite end 126B in a first raised boss 134A of a cover 134. Similarly, the second shaft 128 is held at one end 128A in a second raised boss 111B of the main body 111 and is held at its opposite end 128B in a second raised boss 134B of the cover 134.

Teeth 125 on the second pinion gear 124 mesh with teeth 135 on a third gear 136 which carries and rotates with a third pinion gear 138 that has teeth 139 which, in turn, drive a large output gear 140 mounted on an output shaft 142.

A first collar 144 of the main body 111 has a bore 144B which surrounds a midsection of the output shaft 142 while a second collar 146 secures a nonworking end 142B of the output shaft 142 to the cover 134. A gap 143 is provided between the nonworking end 142B of the output shaft 142 and a bottom 145 of the second collar 146. A lubricant such as grease may be squirted into the gap 143 through a channel 147 bored through the cover 134.

Both the first collar 144 and the second collar 146 are formed integrally with the main body 111 and the cover 134, respectively. This integral formation reduces the number of parts needed for manufacturing the gear box 110 by eliminating the separate collars 44 and 46 in the prior art gear box 10 illustrated in FIG. 1.

Returning to FIG. 2A, the third gear 136, the third pinion gear 138, the output gear 140, and the output shaft 142 are all made of steel. Thus, the gear assembly starts with the small plastic input gear 114 and eventually transitions to the large steel output gear 140 by the unique internal arrangement of the various reduction gears constituting the drive assembly.

At a working end 142A of the output shaft 142, there is a solid steel pin 148 which spins a drum or hopper 106 holding coins or tokens in a slot machine 100. Although the solid steel pin 148 is preferred, any other suitable type of coupling may be used, such as a threaded shaft, a D-shaft, a shaft with double flat ends, etc.

So, there are three shafts, namely the central shaft 126, the second shaft 128 and the output shaft 142. The output shaft 142 has a longer length and a thicker diameter than the central shaft 126 and the second shaft 128 so that the output shaft 142 is able to carry the output gear 140 which is much larger than the first gear 118, the second gear 122, and the third gear 136. Although the central shaft 126 and the second shaft 128 have the same length and the same diameter and each of the shafts 126 and 128 carry gears 136 and 122, respectively, which have the same diameter, the pinion gears 138 and 124 have different diameters. However, the pinion gear 120 carried with the first central gear 118 has the same diameter as the pinion gear 124 formed integrally with the second gear 122. Thus, although the first central gear 118 and the third gear 136 are mounted on the same central shaft 126, these gears 118 and 136 are driven independently of each other by the input gear 114 and the second pinion gear 124, respectively.

A bore 150 through the main body 111 allows a user to locate the one end 128A of the second shaft 128 from outside the gear box 110. Likewise, a concave dimple 152 in the main body 111 serves to allow the user to locate the one end 126A of the central shaft 126 from outside the gear box 110. However, unlike the bore 150, the dimple 152 does not penetrate completely through an exterior surface of the main body 111, but may be easily drilled through in order to reach the central shaft 126, if necessary.

By engaging both the central shaft 126 through the drilled dimple 152 and the second shaft 128 through the bore 150, the user may extract the gear box 110 from the D.C. motor 112, if the gear box 110 cannot be removed because it is stuck in place by the D.C. motor 112.

Figure 2B:
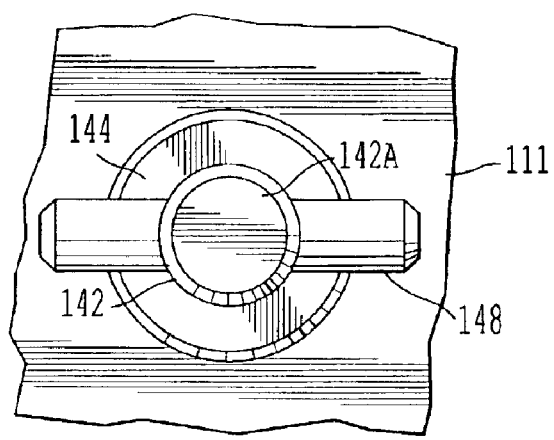
FIG. 2B is a partial top plan view taken along line 2B—2B of FIG. 2A.

In FIG. 2B, there is seen a partial top plan view of the main body 111 from which the first collar 144 protrudes to retain the output shaft 142 with its working end 142A through which the solid steel pin 148 extends.

Clearly, the solid steel pin 148 of the present invention is stronger and more torque resistant than the C-shaped pin 48 of the prior art device seen in FIG. 1. Thus, the pin 148 of the present invention is able to work harder than the weak pin 48 of the prior art device.

Figure 3A:
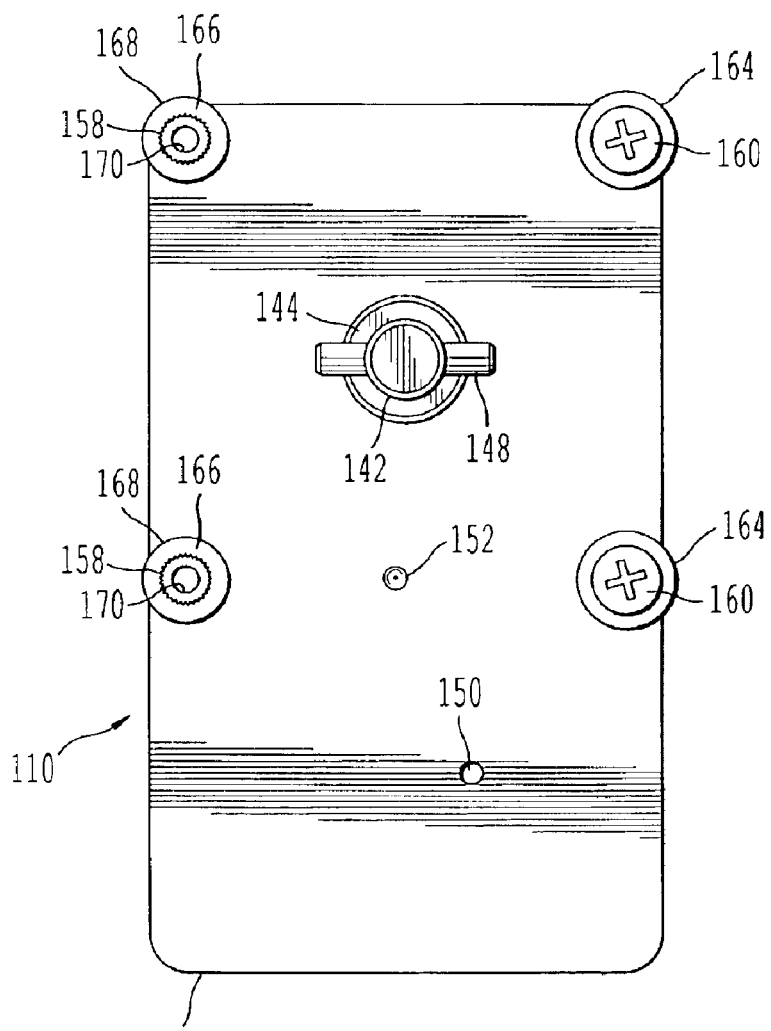
FIG. 3A is a bottom plan view of the main body of the gear box.

In FIG. 3A, there is illustrated a bottom plan view of the main body 111 of the gear box 110. The pin 148 extends through the output shaft 142 which is surrounded at its midsection (not shown) by the first collar 144.

There are four vertically grooved holes 158 of which only two are shown on a left side of the main body 111. On a right side of the main body 111, there are seen two of four heads 160 on threaded bolts 162, not shown in FIG. 3A but seen instead in FIG. 2A, where two of the four heads 160 are also illustrated. As shown in both FIGS. 2A and 3A, a washer 164 separates each head 160 from a top 166 of a raised protuberance 168 formed integrally with the main body 111.

As seen in FIG. 3A, the four holes 158, of which only two are shown, are positioned on the main body 111 symmetrically and equidistantly from the output shaft 142 so that, when the bolts 162 (not shown) under the heads 160 are threaded into the holes 158, the output shaft 142 has superior stability and maximum strength whenever the pin 148 is exerting torque to perform work.

Of course, instead of the bolts 162 seen in FIG. 2A, a plurality of other types of suitable fasteners, such as long screws, may be placed in the holes 158 to stabilize the output shaft 142 and also may be used to mount the gear box 110 securely to a wall 104 of the slot machine 100.

Preferably, as seen in FIG. 3A, the vertically grooved holes 158 are provided with correspondingly grooved steel or brass inserts 170 which are internally threaded for receiving the bolts 162 seen in FIG. 2A.

Figure 3C:
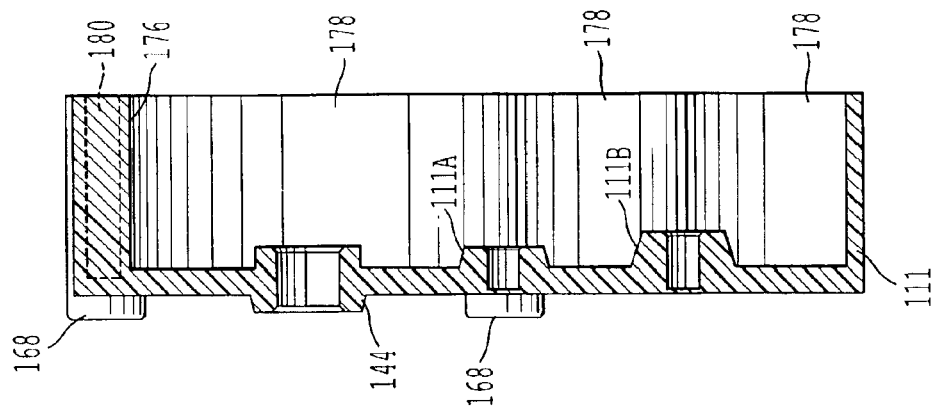
FIG. 3C is a cross-sectional side elevation view taken along line 3C—3C of FIG. 3B.
Figure 3B:
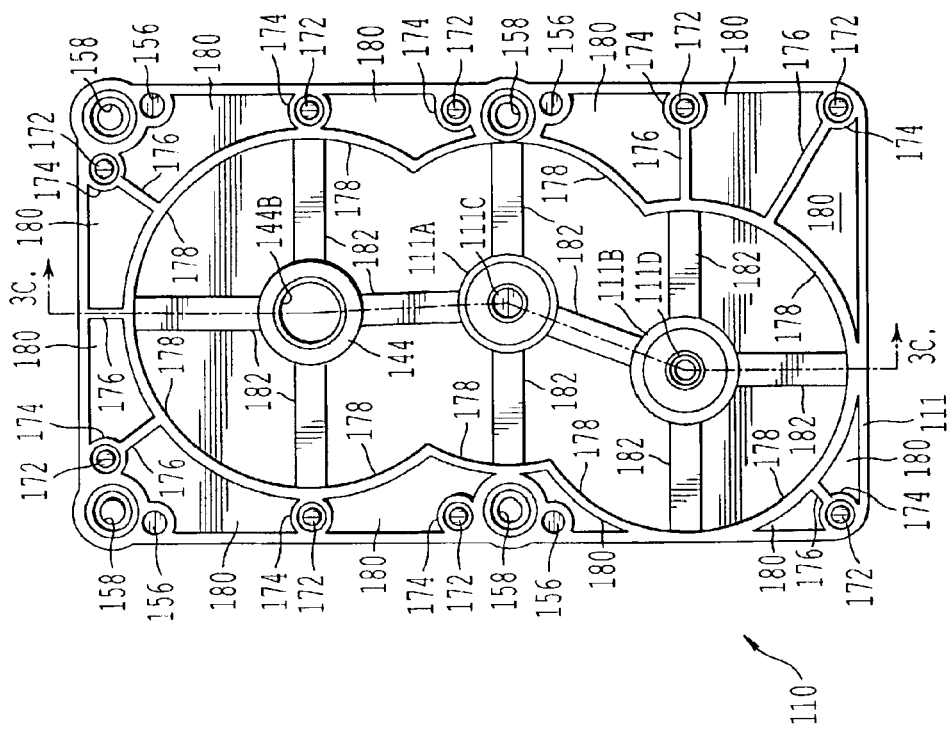
FIG. 3B is a top plan view of the main body of the gear box with the internal drive assembly removed therefrom.

FIG. 3B shows a top plan view of the main body 111 of the gear box 110 with the internal drive assembly and the cover 134 (not shown) removed therefrom.

The four holes 158 are positioned symmetrically and equidistantly from a center of the bore 144B through the first collar 144. An end view of each of a plurality of hollow holding tubes 156 is seen adjacent to each of the four holes 158.

A plurality of inner welding pads 172 is formed integrally and is arranged along an outer periphery of the main body 111. Each pad 172 is separated by a space from a surrounding short outer tube 174. Each pad 172 is preferably circular and each tube 174 is preferably cylindrical in shape. However, other shapes may be used, if desired. These pads 172 are heated ultrasonically so that each pad 172 partially melts with its corresponding short tube 174 in order that the main body 111 is welded to the cover 134, seen in FIG. 2A, to keep the gear box 110 securely sealed shut.

In FIG. 3B, thin rib walls 176 radiate from some of the short tubes 174 to an inner periphery which is made up of a plurality of arcuate wall sections 178 formed integrally inside the main body 111. Thus, the outer periphery of the main body 111, the short tubes 174, the thin rib walls 176, and the arcuate wall sections 178 together form differently shaped acoustical chambers 180 which may be full of insulating air or packed with grease for noise reduction. Note that each chamber 180 is formed integrally in the main body 111.

The arcuate wall sections 178 together form an enclosed space within which lubricant for the drive assembly is readily retained. Because the lubricant cannot fly out of the enclosed space surrounding all of the shafts and the gears of the drive assembly while the gears are turning on the shafts, the gears have a longer work life and need to be lubricated less frequently. Within the arcuate wall sections 178, besides the first collar 144, there is the first raised boss 111A and the second raised boss 111B. A blind hole 111C in the first raised boss 111A receives the one end 126A of the central shaft 126 seen in FIG. 2A while a flanged hole 111D in the second raised boss 111B receives the one end 128A of the second shaft 128, also seen in FIG. 2A.

In FIG. 3B, thick ribs 182 radiate from the first collar 144, the first raised boss 111A, and the second raised boss 111B to the arcuate wall sections 178 which form an internal space for retaining the drive assembly so that no individual gear may fly away in the unlikely event that a shaft breaks and a gear slips off.

FIG. 3C shows a cross-sectional side elevation view of the main body 111 taken along line 3C—3C in FIG. 3B. The curvature of three arcuate wall sections 178 is clearly illustrated throughout most of FIG. 3C. Along the left side of the main body 111, there are seen the first collar 144, the first raised boss 111A, and the second raised boss 111B. Two of the four raised protuberances 168 are also shown. Behind one of the thin rib walls 176, there is seen in phantom lines part of one of the acoustical chambers 180.

FIG. 4A shows the cover 134 with its underside that faces the internal drive assembly. Around the periphery of the underside, there are arranged a plurality of locating posts 154, a plurality of welding rings 184, and a plurality of locating ribs 186.

Referring back to FIG. 3B, each welding ring 184 seen in FIG. 4A is fitted snugly into the space between its corresponding inner welding pad 172 and its corresponding outer short tube 174 so that, when ultrasonic radiation is applied to each combination of the ring 184, the pad 172 and the tube 174, the combination melts together in order to weld the cover 134 onto the main body 111 to close the gear box 110 securely.

Referring again to FIG. 3B, each locating rib 186 seen in FIG. 4A is positioned so as to snap into a corresponding acoustical chamber 180 along the outer periphery of the main body 111 to help in providing secure closure of the cover 134 over the main body 111.

In FIG. 4A, away from the outer periphery of the cover 134, there are arranged the second collar 146, the first raised boss 134A, and the second raised boss 134B. A flanged hole 134C in the first raised boss 134A receives the opposite end 126B of the central shaft 126 seen in FIG. 2A while a blind hole 134D in the second raised boss 134B receives the opposite end 128B of the second shaft 128, also seen in FIG. 2A.

In FIG. 4A, thick ribs 194 radiate from each of the second collar 146 and the bosses 134A, 134B to reinforce the cover 134. The channel 147 is seen at the bottom 145 of the second collar 146.

A circular opening 188 is provided in the cover 134 so that the input gear 114, seen in FIG. 2A, may be inserted therethrough for meshing with the first central gear 118, also seen in FIG. 2A.

Referring again to FIG. 4A, there is a pair of holes 190 spaced equidistantly from a center of the circular opening 188. Each hole 190 has an internal flange 192 for retaining a head of a screw (not shown) which secures the D.C. motor 112, seen in FIG. 2A, to a top side of the cover 134.

FIG. 4B shows a cross-sectional side elevation view of the cover 134 taken along line 4B—4B of FIG. 4A. At the top of FIG. 4B, there are seen side views of locating posts 154, side views of the welding rings 184, and end views of the locating ribs 186. These locating posts 154, welding rings 184 and locating ribs 186 are formed integrally on an inner side of the cover 134. The second collar 146 and the bosses 134A, 134B are also clearly illustrated.

FIG. 4B also shows the gap 143 which receives lubricant through the channel 147 in the bottom 145 of the second collar 146. Furthermore, there are clearly illustrated the flanged hole 134C in the first raised boss 134A and the blind hole 134D in the second raised boss 134B of the cover 134.

A mounting pad 196 is formed integrally with the top side of the cover 134. The mounting pad 196 holds the D.C. motor 112, seen in FIG. 2A, by the screws (not shown) which pass through the holes 190 seen in FIG. 4A.

FIG. 4C shows a top plan view of the cover 134 with the main body 111 (not shown) underneath. The mounting 196 surrounds the circular opening 188. The holes 190 bored through a first pair of thick arms 196A of the mounting 196 receive screws (not shown) which secure the D.C. motor 112, seen in FIG. 2A, to the top side of the cover 134. A second pair of thin arms 196B helps balance the motor 112 on the cover 134 so that there is no wobble of the motor 112 during operation.

Also in FIG. 4C, there are illustrated portions of the four protuberances 168 and the channel 147 through which lubricant may be squirted.

A second dimple 152A is provided to allow access, upon drilling therethrough, to the first central gear 118, seen in FIG. 2A.

Also, in FIG. 4C, there is a bore 198 through which the opposite end 126B of the central shaft 126, shown in FIG. 2A, may be viewed and accessed, if necessary.

FIG. 5 is a partially cutaway cross-sectional view of the gear box 110 with the internal drive assembly removed therefrom. The mounting pad 196, seen in a side elevational view, is formed integrally on the top side of the cover 134.

In the partially cutaway view in the upper right corner of FIG. 5, there is seen a side elevational view of one of the welding rings 184 and one of the locating posts 154 projecting into a corresponding hollow holding tube 156.

The cover 134 has a plurality of these locating posts 154, of which only one is shown for the sake of simplicity, around a periphery of the cover 134. Each locating post 154 extends into its corresponding hollow holding tube 156 which is formed integrally on the main body 111 and which corresponds in position to its post 154 so that the cover 134 is located securely on the main body 111. Each post 154 is ultrasonically welded into its corresponding hollow holding tube 156 in order to increase the strength of the gear box 110 to resist high levels of torque and also to improve alignment of the cover 134 on the main body 111.

Adjacent to the tube 156, one of the acoustical chambers 180 is illustrated in phantom lines behind one of the thin rib walls 176.

The channel 147 bored through the cover 134 into the bottom 145 of the second collar 146 allows the user to squirt lubricant into the gap 143 behind the output shaft 142 (not shown) which is surrounded at its midsection by the first collar 144. Thus, the output shaft 142, seen in FIG. 2A, is securely aligned as it is held at its midsection by the bore 144B of the first collar 144 and at its nonworking end 142B, seen in FIG. 2A, in the gap 143 at the bottom 145 of the second collar 146.

Similarly, as also shown in FIG. 5, the blind hole 111C in the first raised boss 111A of the main body 111 receives the one end 126A of the central shaft 126, seen in FIG. 2A, while the flanged hole 134C in the first raised boss 134A of the cover 134 receives the opposite end 126B, also shown in FIG. 2A, so that the central shaft 126 is secured at both ends 126A, 126B and is aligned between the first raised boss 111A of the main body 111 and the first raised boss 134A of the cover 134 when the cover 134 is ultrasonically welded to the main body 111 to form the gear box 110.

Likewise, as also seen in FIG. 5, the flanged hole 111D in the second raised boss 111B of the main body 111 receives the one end 128A of the second shaft 128, seen in FIG. 2A, while the blind hole 134D in the second raised boss 134B of the cover 134 receives the opposite end 128B so that the second shaft 128 is received at both ends 128A, 128B and is aligned securely between the second raised boss 111B of the main body 111 and the second raised boss 134B of the cover 134 when the cover 134 is ultrasonically welded to the main body 111 to form the gear box 110.

Referring again to FIG. 5, the main body 111 and the cover 134 are secured to each other by ultrasonic welding to form the gear box 110 without screws. Although screws (not shown) are used to secure the D.C. motor 112, seen in FIG. 2A, to the top side of the cover 134, and the threaded bolts 162, also seen in FIG. 2A, are used to secure the gear box 110 through the wall 104 to the slot machine 100, these screws (not shown) and bolts 162 do not secure the cover 134 onto the main body 111 so as to form the gear box 110.

The assembly of the invention is as follows, with initial reference to FIG. 2A. When the main body 111 is empty with the cover 134 off, the drive assembly is put into place in the following manner.

First, the output shaft 142 with the output gear 140 attached thereto is dropped into the bore 144B of the first collar 144. To prevent slippage of the output gear 140 along the output shaft 142, the first collar 144 retains the output gear 140 on the output shaft 142 at one side. The pin 148 is then slipped through the working end 142A of the output shaft 142 to prevent the output shaft 142 from falling out of the other side of the first collar 144.

Next, the one end 126A of the central shaft 126 is inserted into the first raised boss 111A of the main body 111. Then, the third gear 136 with the third pinion gear 138 is slipped onto the central shaft 126 until the third pinion gear 138 abuts against the first raised boss 111A.

Subsequently, the one end 128A of the second shaft 128 is inserted into the second raised boss 111B of the main body 111. Then, the second gear 122 with the second pinion gear 124 is slipped onto the second shaft 128 until the second pinion gear 124 abuts against the second raised boss 111B.

The first central gear 118 with the first pinion gear 120 is then slipped over the central shaft 126 until the first pinion gear 120 abuts against the third gear 136 already on the central shaft 126.

Now referring to the cover 134, the small input gear 114 is slipped over and secured onto the input shaft 116 of the D.C. motor 112 which is next secured to the mounting 196 of the cover 134 by tightening screws (not shown) through the holes 190 seen in FIGS. 4A and 4C. As a result, the input gear 114 of FIG. 2A is extended through the circular opening 188 seen in FIGS. 4A and 4C.

As illustrated in FIG. 5, the cover 134 with the motor 112 (not shown) secured to the mounting 196 is then fitted onto the main body 111 by placing each locating post 154 into its corresponding hollow holding tube 156.

Simultaneously, as shown in FIG. 4A, each welding ring 184 on the cover 134 will fit into the space between its corresponding welding pad 172 and short tube 174 shown in FIG. 3B. Likewise, each locating rib 186 in FIG. 4A will snap into its corresponding acoustical chamber 180 in FIG. 3B.

With reference to FIG. 2A, when the cover 134 is secured by ultrasonic welding onto the main body 111, the output gear 140 will be retained on the output shaft 142 between the first collar 144 of the main body 111 and the second collar 146 of the cover 134. Thus, the first collar 144 retains the output gear 140 on one side while the second collar 146 retains the output gear 140 on an opposite side.

Because the D.C. motor 112 is secured onto the cover 134 instead of onto the main body 111, the entire drive assembly inside the gear box 110 can be fully tested prior to sealing by ultrasonic welding of the cover 134 onto the main body 111. In contrast thereto, in the prior art device shown in FIG. 1, the motor 12 is secured to the main body 11 so that the internal drive assembly cannot be tested until the cover 34 is sealed thereon to form the closed gear box 10.

As best seen in FIG. 5, an assembler can ultrasonically weld the cover 134 to the main body 111 by causing each locating post 154 to melt in its corresponding hollow holding tube 156. As the assembler runs an ultrasonic welding rod (not shown) around the outer periphery of the top side of the cover 134 seen in FIG. 4A, each welding ring 184 will likewise melt and fuse in the space between its corresponding pad 172 and its short tube 174 seen in FIG. 3B. Similarly, each locating rib 186 in FIG. 4A will be fused by the heat of the ultrasonic welding rod (not shown) along an inner edge of its corresponding acoustical chamber 180 in FIG. 3B.

The assembled gear box 110 shown in FIG. 2A is now ready to be secured to the drum or hopper 106 of the slot machine 100. After the pin 148 is engaged into the drum or hopper 106, the gear box 110 is secured to the slot machine 100 by screwing the threaded bolts 162 through an inner side of the wall 104 of the slot machine 100 into the raised protuberances 168 of the main body 111.

The gear box 110 is now ready for operation. Initially, an operator programs the slot machine 100 to dispense a predetermined number of coins or tokens from the drum or hopper 106 after another predetermined number of coins or tokens are inserted into the slot machine 100.

For example, after a player inserts 12 quarters into the slot machine 100, an electrical signal is sent to energize the D.C. motor 112. With reference to FIG. 2A, the motor 112 on the mounting 196 of the cover 134 turns the input shaft 116 so as to rotate the small plastic input gear 114. The teeth 115 on the input gear 114 mesh with the teeth 117 on the first central gear 118 so as to turn the gear 118 and the first pinion gear 120. The teeth 121 on the gear 120 mesh with the teeth on the larger second gear 122 and consequently turn the gear 122 and the second pinion gear 124. The teeth 125 on the gear 124 mesh with the teeth 135 on the third gear 136 so that the third gear 136 and the third pinion gear 138 are rotated together.

Note that the third gear 136 and the third pinion gear 138 rotate independently of the first central gear 118 and the first pinion gear 120, even though all four gears 118, 120, 136 and 138 are mounted on the same central shaft 126. The teeth 139 on the gear 138 mesh with the teeth on the large output gear 140 so as to turn the gear 140 and the output shaft 142 secured through the center of the gear 140.

At the working end 142A of the output shaft 142, the pin 148 turns the drum or hopper 106 filled with coins or tokens for a predetermined short period of time until about only ten coins or tokens fall out into a receiving tray (not shown) for the player to collect.

Occasionally, with the prior art device illustrated in FIG. 1, the drum or hopper 6 of the slot machine 1 would become stuck in an open position so that all of the coins or tokens therein would be dumped out and overflow the receiving tray for the player.

Such jackpots, although joyous for the players, are not profitable for the operators of the casinos and other licensed gambling institutions.

As the reader can realize, these jackpots were caused when the prior art gear box 10 failed and allowed the drum or hopper 6 of the slot machine 1 to remain open so that all of the coins or tokens were emptied out as winnings for the players.

With the present invention which is more reliable in operation than the prior art device of FIG. 1, such jackpots will be eliminated and only the predetermined number of coins or tokens will be dispensed after a higher predetermined number of coins or tokens are inserted into the slot machine 100 by each player.

Although the present invention has been described by way of a preferred embodiment, other modifications will be realized by those persons skilled in this particular technology after reading this disclosure. However, these modifications may be considered within the scope of the appended claims if such modifications do not depart from the spirit of this invention.

What I claim as my invention is:

1. A screwless gear box comprising:
   a. a main body having a first raised boss, a second raised boss and a first collar;
   b. a cover ultrasonically sealed onto the main body, said cover having a first raised boss, a second raised boss and a second collar;
   c. a central shaft being held at one end in the first raised boss of the main body and being held at an opposite end in the first raised boss of the cover;
   d. a second shaft being held at one end in the second raised boss of the main body and being held at an opposite end in the second raised boss of the cover; and
   e. an output shaft being held at its midsection by the first collar of the main body and being held at a nonworking end by the second collar of the cover.

2. A gear box, according to claim 1, further comprising:
a coupling being held at a working end of the output shaft.

3. A gear box, according to claim 1, further comprising:
a first central gear mounted on the central shaft.

4. A gear box, according to claim 3, further comprising:
a first pinion gear carried by the first central gear.

5. A gear box, according to claim 4, further comprising:
   a second gear being mounted on the second shaft and being driven by the first pinion gear.

6. A gear box, according to claim 5, further comprising:
   a second pinion gear being carried by the second gear and abutting against the second raised boss of the main body.

7. A gear box, according to claim 6, further comprising:
   a third gear mounted on the central shaft and abutted by the first pinion gear, said third gear being driven by the second pinion gear and rotating independently of the first central gear and the first pinion gear on the central shaft.

8. A gear box, according to claim 7, further comprising:
a third pinion gear being carried by the third gear and abutting against the first raised boss of the main body.

9. A gear box according to claim 8, further comprising:
an output gear being carried by the output shaft and being driven by the third pinion gear, said output gear being retained on the output shaft at one side by the first collar of the main body and being retained on the output shaft at an opposite side by the second collar of the cover.

10. A gear box, according to claim 9, further comprising:
a plurality of inner arcuate wall sections formed in the main body so that an enclosed space is formed surrounding all of the shaft and the gears.

11. A gear box, according to claim 1, further comprising:
a mounting pad being formed integrally on the cover and having a first pair of arms and a second pair of arms.

12. A gear box, according to claim 11, further comprising:
a direct current motor being secured on the cover through the first pair of arms of the mounting pad and being balanced on the cover by the second pair of arms of the mounting pad so that there is no wobble of the direct current motor during operation.

13. A gear box, according to claim 12, further comprising:
an input shaft turned by the direct current motor.

14. A gear box, according to claim 13, further comprising:
an input gear carried and rotated by the input shaft.

15. A gear box, according to claim 3, further comprising:
an input gear configured to drive the first central gear.

16. A gear box according to claim 1, further comprising:
a plurality of fasteners placed in holes positioned on the main body symmetrically and equidistantly from the output shaft.

17. A gear box, according to claim 1, further comprising:
a plurality of locating posts formed on an inner side of the cover.

18. A gear box, according to claim 17, further comprising:
a plurality of hollow holding tubes being formed on the main body and corresponding in position to the plurality of locating posts so that each locating post projects into a corresponding tube.

19. A gear box, according to claim 1, further comprising:
a plurality of welding rings being formed on an inner side of the cover.

20. A gear box, according to claim 19, further comprising:
a plurality of inner welding pads and outer surrounding tubes being formed on the main body and corresponding in position to the plurality of welding rings so that each welding ring fits into a space between the inner welding pad and the outer surrounding tube corresponding thereto.

21. A gear box, according to claim 1, further comprising:
a plurality of locating ribs being formed on an inner side of the cover.

22. A gear box, according to claim 21, further comprising:
a plurality of acoustical chambers being formed in the main body and corresponding in position to the plurality of locating ribs so that each locating rib snaps into the acoustical chamber corresponding thereto.

23. A gear box, according to claim 2, wherein:
said coupling is a solid pin.

* * * * *